United States Patent Office 2,966,487
Patented Dec. 27, 1960

2,966,487
3-AMINOALKYLAMINOBENZOTRIAZINE-1-OXIDES

James Jiu, Morton Grove, and George P. Mueller, Park Ridge, Ill., assignors to G. D. Searle & Co., Chicago, Ill., a corporation of Delaware No Drawing. Filed July 1, 1958, Ser. No. 745,839

3 Claims. (Cl. 260—247.5)

This invention relates to new cycloaliphatic aminoalkylaminobenzotriazine-1-oxide derivatives and to methods by which they can be prepared. They can be represented by the formula

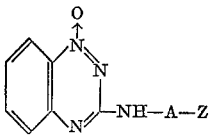

wherein A is a lower alkylene and Z represents a heterocycloaliphatic radical selected from the group consisting of piperidino, pyrrolidino and morpholino. The radical A can represent a polymethylene radical such as ethylene, trimethylene, tetramethylene, pentamethylene or hexamethylene. It can also represent one of the radicals isomeric therewith, such as the propylene, butylene, amylene or hexylene radicals.

The compounds of the invention are prepared by reacting a 3-halogen-1,2,4-benzotriazine-1-oxide with the desired cycloaliphatic aminoalkylamine in the presence of an inert solvent such as the lower alkanols, for example, ethanol, butanol and the like, carbon tetrachloride, chloroform, acetone, dioxane or the like to form the corresponding 3-substituted amino-1,2,4-benzotriazine-1-oxide. The reaction is carried out preferably by heating to reflux in an appropriate solvent for a period of about 2 to 24 hours. The reaction can be completed in a shorter time by heating under pressure at temperatures of about 150°. The reaction product can be obtained on chilling the reaction mixture and recovering the solid material thus formed or by solvent extraction methods in which the reaction solvent is removed and the residue treated with a mixture of water and a water-immiscible solvent. The solvent layer is separated, the solvent removed and the residue crystallized from a suitable organic solvent such as hexane, ethanol, methanol and the like. The reaction above described can be expressed by the following diagram:

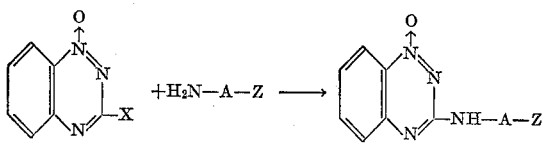

wherein X is halogen, for example, chlorine or bromine, and A and Z have the meanings as aforesaid.

The compounds of the invention have useful pharmacological properties. They potentiate the hypnotic activity of the barbiturates and they exhibit anti-inflammatory activity characteristic of cortisone in relieving hyperemia of the eye.

The invention is described in greater detail in the examples which follow which are presented by way of illustration and not of limitation. Quantities are expressed in parts by weight and parts by volume which bear the same ratio one to another as kilograms to liters. Temperatures are expressed in degrees centigrade.

EXAMPLE 1

*3-(β-morpholinoethyl)amino-1,2,4-benzotriazine-1-oxide*

A suspension of 2 parts by weight of 3-chloro-1,2,4-benzotriazine-1-oxide, in 125 parts by volume of n-butanol and 5 parts by volume of N-aminoethylmorpholine is refluxed for 5 hours. The reaction mixture is cooled to room temperature and the crystalline residue which precipitates is collected by filtration and recrystallized from methanol to yield 3-(β-morpholinoethyl)-amino-1,2,4-benzotriazine-1-oxide which melts at 170.5–173°.

EXAMPLE 2

*3-(γ-morpholinopropyl)amino-1,2,4-benzotriazine-1-oxide*

A mixture of 2 parts by weight of 3-chloro-1,2,4-benzotriazine-1-oxide, 125 parts by volume of n-butanol and 5 parts by volume of N-aminopropylmorpholine is refluxed for 2 hours and then distilled to dryness in vacuo. The residue is agitated with 125 parts by volume of water and 100 parts by volume of chloroform, the layers separated and the aqueous layer extracted 3 times with 50 parts by volume portions of chloroform. The combined chloroform extracts are washed with water, dried over sodium sulfate and the solvent removed in vacuo. The residue is crystallized from ethanol to yield 3-(γ-morpholinopropyl)amino-1,2,4-benzotriazine-1-oxide which melts at 143–144.5°.

EXAMPLE 3

*3-(δ-piperidinobutyl)amino-1,2,4-benzotriazine-1-oxide*

A mixture of 14 parts by weight of 3-chloro-1,2,4-benzotriazine-1-oxide, 500 parts by volume of n-butanol and 40 parts by volume of N-aminobutylpiperidine is refluxed for two and one-half hours and then evaporated to dryness in vacuo. The residue is treated with 250 parts by volume of water and the aqueous mixture extracted three times with 125 parts by volume portions of carbon tetrachloride. The combined carbon tetrachloride extracts are washed with water, dried over anhydrous sodium sulfate and the solvent removed in vacuo. The residue is crystallized from methanol to yield 3-(δ-piperidinobutyl)amino-1,2,4-benzotriazine-1-oxide.

EXAMPLE 4

*3-(γ-pyrrolidinopropyl)amino-1,2,4-benzotriazine-1-oxide*

A mixture of 14 parts by weight of 3-chloro-1,2,4-benzotriazine-1-oxide, 600 parts by volume of ethanol and 33 parts by volume of N-aminopropylpyrrolidine is heated in an autoclave for one hour at 150°. After cooling the mixture is distilled to dryness in vacuo and the residue treated with 300 parts by volume of water and the aqueous mixture extracted three times with 125 parts by volume portions of chloroform. The combined chloroform extracts are washed with water, dried over anhydrous sodium sulfate and the solvent removed in vacuo. The residue is crystallized from ethanol to yield 3-(γ-pyrrolidinopropyl)amino-1,2,4-benzotriazine-1-oxide.

What is claimed is:
1. A compound of the formula
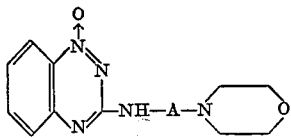
wherein A is lower alkylene.
2. 3-(β-morpholinoethyl)amino-1,2,4 - benzotriazine-1-oxide.
3. 3-(γ-morpholinopropyl)amino-1,2,4 - benzotriazine-1-oxide.
References Cited in the file of this patent
UNITED STATES PATENTS
| | | |
|---|---|---|
| 2,489,355 | Wolf | Nov. 29, 1949 |
| 2,496,364 | Wolf | Feb. 7, 1950 |
FOREIGN PATENTS
| | | |
|---|---|---|
| 767,749 | Great Britain | Feb. 6, 1957 |